United States Patent

[11] 3,619,489

[72] Inventors Hugh F. Frohbach
Sunnyvale;
Albert Macovski, Palo Alto; Philip J. Rice,
Atherton, all of Calif.
[21] Appl. No. 798,677
[22] Filed Feb. 12, 1969
[45] Patented Nov. 9, 1971
[73] Assignee RCA Corporation

[54] SHADOWING SYSTEM FOR COLOR ENCODING CAMERA
8 Claims, 5 Drawing Figs.

[52] U.S. Cl. .......... 178/5.4 ST
[51] Int. Cl. .......... H04n 9/06
[50] Field of Search .......... 178/5.4 ST, 5.2, 5.4; 350/161

[56] References Cited

UNITED STATES PATENTS 2,733,291 1/1956 Kell .......... 178/5.4 ST
3,002,051 9/1961 Tait .......... 178/5.4 ST
3,378,633 4/1968 Macouski .......... 178/5.4 ST

FOREIGN PATENTS 1,092,882 11/1967 Great Britain .......... 178/5.4

OTHER REFERENCES

Wolf, Progress in Optics, Vol. I, pp. 187- 195, published by North-Holland Publishing Co., Amsterdam (1961)

*Primary Examiner*—Robert L. Griffin
*Assistant Examiner*—John C. Martin
*Attorney*—Eugene M. Whitacre

ABSTRACT: In a color-encoding camera utilizing a color-encoding strip filter arrangement in the optical path to separate light from an object into its component colors, a shadowing grating arrangement is utilized to image the encoding filter strips efficiently onto a photosensitive medium without the use of a relay lens.

Inventors:
HUGH F. FROHBACH,
ALBERT MACOVSKI &
PHILIP J. RICE
BY Eugene M. Whitacre
ATTORNEY

SHADOWING SYSTEM FOR COLOR ENCODING CAMERA

BACKGROUND OF THE INVENTION

This invention relates to color-encoding cameras, and more particularly, to a shadowing system for imaging color-encoding filter strips onto a photosensitive medium.

It is known in the art that a color-encoding filter may be placed in the optical path of a camera to encode the light from an object in terms of component colors, which encoded light may then be recorded on black and white film for subsequent decoding to reproduce the object in color or which encoded light may be imaged onto the photosensitive element of a television camera pickup tube for televising a scene and for subsequent reproduction of the scene in color in a television receiver.

The color-encoding filter may comprise a first grating of alternate and parallel transparent and colored strips of a first color and a second grating superimposed over the first and comprising alternate and parallel transparent and colored strips of a second color. The colored strips may be red and blue for example, or be of subtractive primary colors such as cyan and yellow, for example. The latter type is more efficient from a point of view of overall light transmission and in that the entire filter area may be used for color-encoding as well as luminance or brightness signal transmission.

A color-encoding filter utilizing subtractive primary color strips may be of the type described in U.S. Pat. No. 3,378,633 to Albert Macovski. The filter described by Macovski comprises a first grating of transparent and cyan strips and a second grating of transparent and yellow strips superimposed over the first grating with the first and second gratings angularly disposed 45° from each other. The spacing of the strips in each grating is the same. With the line density of the gratings being in the order of 500 strip pairs per inch (a strip pair consisting of one colored and one transparent strip) imaged onto a ½ inch wide photosensitive surface of an image pickup tube, The cyan and transparent grating being disposed perpendicular to the direction of the scanning lines of the pickup tube in a television camera, and the yellow and transparent grating lines being disposed 45 degrees from the direction of the scanning lines, amplitude modulated carrier waves having fundamental frequencies of 5.0 MHz. and 3.5 MHz. for the red and MHz color representative signals, respectively, are derived at the output of the pickup tube. The luminance or brightness information is contained in the average signal derived from light transmitted by the encoding filter onto the photosensitive element of the pickup tube. The electrical signal from the pickup tube is processed to develop the separate luminance, R–Y and B–Y signals.

In a color television camera a color-encoding filter of the type described above may be placed in front of the pickup tube adjacent the faceplate. The light from a subject or scene to be televised is filtered by the color-encoding filter and then impinges upon the photosensitive element of the camera pickup tube after passing through the glass faceplate of the tube. The pickup tube may be a vidicon, for example. It is desirable that the encoding filter strip pattern be sharply imaged on the photosensitive electrode so that there is maximum modulation of each of the encoded color signals. In the case of the cyan-transparent grid of the encoding filter described by Macovski, for example, it is desirable that the light passing through the transparent strips does not impinge upon those areas of the photosensitive electrode located behind the cyan strips in order that only the presence or absence of red light modulates the carrier signal derived from the vidicon as the electron beam scans those areas of the photosensitive electrode. The gratings will be sharply imaged on the photosensitive electrode if the light rays passing through the encoding filter strips are parallel or nearly parallel. If the camera lens is stopped down to a relatively small aperture, *f*22 or *f*32, for example, the light rays passing therethrough will be substantially parallel and the encoding filter strips will be sharply imaged on the photocathode. However, frequently it is desirable to increase the aperture size of the camera lens to obtain sufficient illumination or to achieve other effects. At large camera lens aperture sizes such as *f*4.5, for example, the rays of light passing through the lens will not be parallel and the encoding filter strips will not be imaged sharply onto the photosensitive electrode, resulting in a loss of modulation of the encoded colors as previously described.

In the past, one approach to imaging the encoding filter strips onto the photosensitive electrode of the pickup tube has been to insert a relay lens in the optical path between the color-encoding filter and the photosensitive electrode. In such an arrangement, the scene is imaged onto the color-encoding filter and the relay lens serves to reimage the combination of the scene plus the encoding filter strips onto the photosensitive surface of the camera pickup tube. Thus, in a camera utilizing a relay lens to focus the encoding filter strips it is necessary that the encoding filter be in an image plane. Hence, any dust on the filter and any deflect of the filter would be in focus at the photosensitive surface and usually undesirably appear in the televised scene. Also, a relay lens adds to the cost, size and weight of the optical system used with a camera.

In a shadowing system of a type described in U.S. Pat. No. 2,733,291 to R. D. Kell, a shadowing grating having strips of primary colors and a separate transparent area for passing the luminance signal is disposed in the optical path ahead of (i.e., between a subject and) a color-encoding filter having strips of subtractive primary colors. The use of such a shadowing grating permits a given primary color to be encoded only over a portion of the total filter area, resulting in decreased light transmission efficiency, and the separate transparent area of the shadowing grating permits the luminance signal to appear over the entire encoding filter, thereby reducing the modulation of the separate primary color signals.

An object of this invention is to provide apparatus for imaging color encoding filter strips with high light efficiency onto a photosensitive surface without the use of a relay lens.

SUMMARY OF THE INVENTION

In a color-encoding camera utilizing color-encoding filter means to separate light from a scene into component colors, shadowing grating means are disposed in the optical path in collimating relationship with the color-encoding filter means such that an image of the subject is focused onto a photosensitive medium, and furthermore, an image of the color-encoding filter pattern is also formed on the medium.

In one embodiment of the invention a shadowing grating having strips of material for blocking light of one primary color and passing light of other colors alternating with transparent strips is placed in collimating relationship with a color-encoding filter having alternate strips of the same materials as the shadowing grating to shadow a color-encoding filter pattern onto a photosensitive medium.

In another embodiment, a phase or density grating having a first spatial frequency is placed in the optical path between a photosensitive medium and a color-encoding filter, the filter having strips of material selected for blocking light of one primary color and passing light of other colors alternating with transparent strips. The filter strips are so disposed as to be associated with one or more spatial frequencies lower than the first spatial frequency of the phase or density grating for producing image-representative signal frequencies at the photosensitive medium equal to the difference between the first spatial frequency of the phase or density grating and the one or more frequencies associated with the color encoding filter strips.

The invention is more fully described in the following specification taken in conjunction with the accompanying drawing of which:

DESCRIPTION

Figures 1, 2, 3, 4, 5:
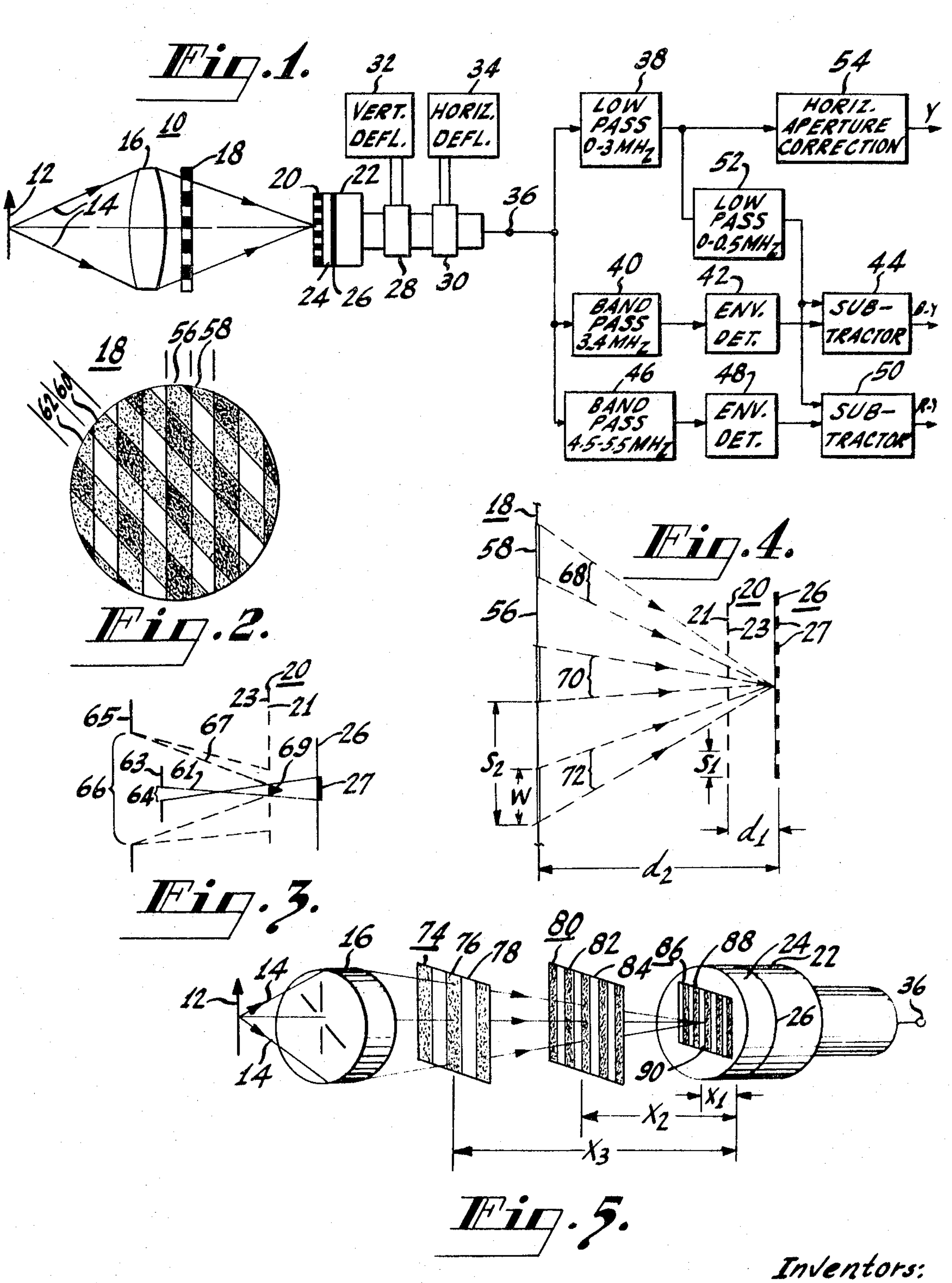
FIG. 1 is a functional block diagram of that portion of a television camera including an optical system necessary for an understanding of the invention.
FIG. 2 illustrates a shadowing grating used in FIG. 1 according to the invention.
FIG. 3 illustrates the effects of light from a large and a small aperture shadowed onto a photosensitive medium by an optical grating.
FIG. 4 illustrates the effect of a shadowing arrangement according to the invention.
FIG. 5 is a functional diagram of the optical portion of a television camera utilizing another embodiment of the invention.

FIG. 1 shows that portion of a single-tube color television camera 10 necessary for an understanding of the invention. Light rays 14 from a scene 12 to be televised pass through a camera lens 16 and are focused or imaged at a photosensitive surface 26 of a pickup tube 22. A shadowing grating 18 is disposed in the optical path ahead of pickup tube 22 and a color-encoding filter 20 is mounted adjacent the faceplate 24 of pickup tube 22. Pickup tube 22 may be a vidicon, for example, in which case the photosensitive surface 26 is a photoconductor. It is to be understood that suitable sources of operating potential are connected to the various elements of tube 22 in a conventional manner.

A source 32 of vertical deflection waveforms provides vertical scanning current for vertical deflection coils 28. A source 34 of horizontal deflection waveforms provides horizontal scanning current for horizontal deflection coils 30. The deflection coils direct the electron beam of tube 22 over the target to scan a raster. The output signal of the pickup tube 22 is taken from an output terminal 36 and applied simultaneously to a low-pass filter circuit 38 and to band-pass filter circuits 40 and 46, which pass, respectively, frequencies in the ranges bandpass 3–4 MHz. and 4.5–5.5 MHz. The bandpass of respective filters 40 and 46 includes the carrier frequencies generated by the corresponding gratings of encoding filter 20. The output of filter circuit 38 is applied to a low-pass filter circuit 52 having a bandpass from 0 to 0.5 MHz. The output of a low-pass filter circuit 52 is applied simultaneously to a subtractor circuit 44 and a subtractor circuit 50. The output of filter circuit 38 is also applied to a horizontal aperture correction circuit 54. The output of band-pass filter 40 is applied to an envelope detector 42. The output of detector 42 is applied to subtractor circuit 44. The output of band-pass filter circuit 46 is applied to an envelope detector 48. The output of detector 48 is applied to subtractor circuit 50.

The output of horizontal aperture correction circuit 54 is the "Y, " or luminance signal, to which horizontal detail has been added. The output of subtractor 44 is the B–Y signal and the output of subtractor 50 is the R–Y signal. These signals may be combined with a subcarrier in conventional manner to produce a composite waveform representative of the luminance and chrominance light components of the televised scene.

In operation, light rays 14 from a scene 12 to be televised pass through camera lens 16 and through shadowing grating 18 to a color encoding filter 20, which may be of a type described in the previously mentioned Macovski patent. The encoding filter 20 may have the line density and relative angular disposition of the superimposed cyan-transparent and yellow-transparent gratings such that the –R light component signal and the –B light component signal are produced at carrier frequencies of 5.0 MHz. and 3.5 MHz., respectively. The luminance information is contained in the average light passing through the encoding filter. The light passing through the encoding filter 20 then impinges on photoconductor 26 to form an image thereon.

FIG. 3 illustrates a problem encountered as light rays from a large aperture (i.e., small "*f*" number such as *f*4) pass through color-encoding filter 20 and image on the photoconductor 26. The dark area 27 on photoconductor 26 represents one of the areas which would ideally be shadowed by the colored strips 23 of encoding filter 20. Light rays 61 from a bundle of light rays 64 passing through a relatively narrow aperture 63 (e.g., *f*22) shadow the encoding strip 23 of encoding filter 20 onto an area 27 of photoconductor 26. Light rays 67 from a bundle of rays 66 passing through a relatively large aperture 65 shadow the encoding strip 23 only in a small area 69 behind the strip, and the strip 23 is not shadowed onto the photoconductor 26. Thus, with the camera lens set at a relatively large opening, the encoding strips 23 of filter 20 are not imaged on photoconductor 26 and therefore the desired modulated signal is not produced as the photoconductor is scanned by an electron beam.

FIG. 2 shows a shadowing grating 18 which may be disposed in the optical path ahead of the encoding filter 20 as shown in FIG. 1 to provide the increased illumination such as provided by a relatively large aperture as well as to image the encoding filter strips on the photoconductor 26 of the pickup tube for producing maximum modulation of the encoded light signals.

One embodiment of the shadowing system comprises a shadowing grating 18, illustrated in FIG. 2, having a first grid of alternate and parallel cyan and transparent strips 56, 58, and a second grid superimposed on the first grid and having alternate and parallel yellow and transparent strips 60, 62. The shadowing grating 18 is disposed in the optical path such that the strips of the first grid (cyan-transparent strips) are parallel to the corresponding cyan-transparent strips of encoding filter 20 and the strips of the second grid (yellow-transparent strips) are parallel to the corresponding yellow-transparent strips of encoding filter 20.

The cyan strips 56 of grating 18 absorb red and transmit green and blue while the yellow strips 60 absorb blue and transmit red and green so that the operation of one grid does not interfere with the operation of the other. Thus, for convenience, the invention will be described with regard to the cyan-transparent grids of shadowing grating 18 and color-encoding filter 20 and it is to be understood that the shadowing of the yellow-transparent grid is effected in a similar manner.

Referring to FIG. 4, a shadowing grating 18 having a first grid comprising cyan strips 56 and transparent strips 58 is disposed in the optical path ahead of color-encoding filter 20. Encoding filter 20, which is disposed against the outside surface of the glass faceplate of a pickup tube, has a corresponding first grid comprising cyan strips 23 and transparent strips 21. The photoconductor 26 of a pickup tube 22 is located behind encoding filter 20 a distance $d_1$. $d_1$ is the optical thickness of the glass faceplate of the pickup tube and is typically about 0.1 inch. (The optical thickness is equal to the physical thickness divided by the index of refraction of the glass). The width W of transparent strips 58 of shadowing grating 18 is selected to be the diameter of the camera lens aperture at *f*22, for example. The relationship of the pitch of a strip pair on the shadowing grating 18, the pitch of a strip pair on the encoding filter 20, and the spacing of the strips of each grid from the photoconductor 26 is $S_2/S_1=d_2/d_1$, where $S_2$ is the pitch of the strip pair on the shadowing grating, $S_1$ is the pitch of the strip pair on the encoding filters, $d_2$ is the optical distance of the shadowing grating from the photocathode of the pickup tube, and $d_1$ is the optical thickness of the glass faceplate of the pickup tube. This spacing relationship places the grating 18 and color encoding filter 20 in a collimating relationship such that the light from strips 58 is directed to strips 21 and the light from strips 56 is directed to strips 23 so that an image of the encoding filter strips is formed on the photosensitive electrode 26.

The width W of transparent strips 58 of shadowing grating 18 limits the angle of the light rays of each bundle of light passing therethrough. The narrow bundles of light 68, 70, and 72 thus image in the areas adjacent the shadowed areas 27 on the photoconductor 26. From FIG. 4 it can be seen that substantially all of the light admitted by the transparent strips 58 and 21 will be imaged on the photoconductor 26 in those areas between the shadowed areas 27. Likewise, the light passing through cyan strips 56 will be shadowed onto the photosensitive surface 26 by strips 23 of encoding filter 20. In this manner, the grid of encoding filter 20 is imaged on the photoconductor and there will be maximum modulation of the encoded color (minus red for the cyan strips) signal as the electron beam of the pickup tube scans the photoconductor. The strip pattern is repeated over the entire surface of the shadowing grating such that the total amount of light passing through the shadowing grating is much greater than the light which would be passed by a single aperture of f22.

In the shadowing system described above the angular disposition of the yellow-transparent grid of the shadowing grating relative to the cyan-transparent grid is the same as the angular disposition of the corresponding grids of the encoding filter described in the previously mentioned Macovski patent. In one embodiment the cyan-transparent grid is disposed perpendicular to the direction of the scanning lines and the yellow-transparent grid is disposed 45° from the cyan-transparent grid. This arrangement provides carriers of 5.0 MHz. and 3.5 MHz. for the minus red and minus blue signals as previously described.

In the arrangement described above both grating 18 and filter 20 serve to encode colors. By having the strips of the fine encoding filter 20 of the same material as the corresponding strips of grating 18, high transmission efficiency is obtained in that the entire area of filter 20 encodes colors. As an alternative arrangement filter 20 may comprise a phase or density grating having the same pitch as the fine encoding filter would in the arrangement described above. A density grating comprises alternate and parallel, opaque and transparent strips while a phase grating comprises a plurality of clear adjacent areas, each area having a predetermined thickness variation across its width. Grating 18, having the alternate transparent and colored strips will then serve as the only color-encoding grating and the density or phase grating 20 will interact with the coarse encoding grating 18 to image the desired number of encoding strips onto the photosensitive surface 26. While a density or phase grating may be easier to make than an encoding filter having the same line density, the density grating has the disadvantage that the opaque strips do not pass any light and, hence, there will be a loss of light efficiency in the encoding process.

In another embodiment of the shadowing system the respective gratings of the shadowing grating and the color encoding filter may be disposed 90° relative to each other. In this arrangement, there is a minimum interaction of one set of shadowed gratings with the other. However, the shadowing grating and the encoding filter will then have to be angularly disposed relative to the direction of the scanning lines in order for two carriers having the ratio of 5.0/3.5=1.43 to be generated. For example, if both gratings of the respective shadowing grating and color encoding filter have the same line density, one such arrangement exists if one set of corresponding gratings is disposed 55° from the direction of the scanning lines and the other set of corresponding gratings is disposed 145° from the direction of the scanning lines. The pitch of the gratings of the color-encoding filter and the shadowing grating is selected to yield carrier signals of 3.5 MHz. and 5.0 MHz. when scanned by the electron beam. With this arrangement the resolution in the direction of the scanning lines is reduced by a factor equal to the sine of the angles at which the two grids are disposed from a normal to the scanning lines.

Referring to FIG. 5, another embodiment of the invention is shown. Light rays 14 from a scene 12 to be televised pass through camera lens 16, color-encoding gratings 74 and 80, and density grating 86 to impinge on photoconductor 26 of camera pickup tube 22. The electrical signals appearing at an output terminal 36 of pickup tube 22 may be applied to a signal processing network similar to that shown in FIG. 1.

Color-encoding grating 74 may comprise alternate and parallel cyan and transparent strips 76 and 78 for encoding red. Color-encoding grating 80 may comprise alternate and parallel, yellow and transparent strips 82 and 84 for encoding blue. The luminance information is contained in the average light transmitted by both encoding gratings. Density grating 86 may comprise alternate and parallel, opaque and transparent strips 88 and 90. The density grating 86 is disposed adjacent the external surface of glass faceplate 24 of pickup tube 22.

The strips of encoding gratings 74 and 80, and density grating 86 are parallel to each other. The gratings may be disposed such that their strips are perpendicular to the direction of the scanning lines of the electron beam of pickup tube 22 so that there is maximum resolution of signals in the direction of the scanning lines for any given strip densities of the three gratings.

As mentioned in the description of the shadowing grating used in the embodiment shown in FIG. 1, the cyan strips absorb red light and pass other colors and the yellow strips absorb blue light and pass other colors. Therefore, encoding grating 74 will not affect the operation of encoding grating 80 and density grating 86, and encoding grating 80 will not affect the operation of encoding grating 74 and density grating 86.

The arrangement shown in FIG. 5, in which the encoding gratings and the density grating are in separate planes, produces two carrier frequencies as the photoconductor 26 of the pickup tube 22 is scanned. The two carrier frequencies will be the spatial frequency of the combination of the encoding grating 74 and the density grating 86, and the spatial frequency of the combination of encoding grating 80 and the density grating 86. Thus, each grating combination results in a separate difference frequency. One advantage of this arrangement is that only one fine grating is required to generate the two different color carrier frequencies.

In the arrangement illustrated in FIG. 5 the density or phase grating 86 is disposed closest to the photoconductor. This arrangement enables color-encoding gratings 74 and 80 to have relatively coarse grating structures for producing the desired encoded color spatial frequencies at the photoconductor 26. It is much easier to build color-encoding gratings with correct colorimetry when the strips of each grating are relatively wide. At the same time, it is easy to produce density or phase gratings having line densities in the order of that required in this arrangement. If one of the color-encoding gratings were placed closest to the photoconductor it would have to have a spatial frequency higher than that required at the photoconductor, and would usually be more difficult and expensive to make. Similarly, as described in the embodiment illustrated in FIG. 1, the phase or density grating 86 may be replaced by a color encoding grating having strips of cyan, yellow and transparent material.

The operation of the arrangement shown in FIG. 5 may be understood from the following explanation. Line density is defined as the number of pairs of opaque and transparent or colored and transparent strips per unit length. Let $n_1$ equal the line density of density grating 86, $n_2$ equal the line density of blue-encoding grating 80, and $n_3$ equal the line density of red-encoding grating 74. As shown in FIG. 4, density grating 86 is spaced a distance $x_1$ from photocathode 26, and encoding gratings 80 and 74 are spaced distances of $x_2$ and $x_3$, respectively, from photoconductor 26. The spatial frequency $\hat{n}$ at the photoconductor of each of the grating combinations is determined as follows:

$$(1)\ \hat{n}_{blue}=n_1-n_2,\ \text{and}\ \hat{n}_{red}=n_1-n_3$$

The spatial frequency at the photoconductor may also be determined by ray tracing in a manner similar to that illustrated in FIG. 4, substituting phase or density grating 86 for encoding filter 20, and substituting grating 74 or 80 for grating 18.

For focusing of the above-mentioned spatial frequencies onto the photoconductor 26, the following relationship must exist:

$$(2)\ n_1x_1=n_2x_2,\ \text{and}\ n_1x_1=n_3x_3$$

For example, the density grating 86 may be selected to have 300 line pairs per inch, the red encoding grating 80 may have 100 line pairs per inch and the blue encoding grating 74 may have 15 line pairs per inch. The resultant grating imaged on the photoconductor will be $\hat{n}_{red}$=300−100=200 line pairs per inch, and $\hat{n}_{blue}$=300−15=285 line pairs per inch. $\hat{n}_{blue}$ and $n_{red}$ imaged on a 1½ inch photoconductor will then produce blue and red carrier frequencies of approximately 3.7 MHz. and 5.3 MHz., respectively, as the photoconductor is scanned by an electron beam according to the established television scanning rates in the United States.

The explanation of the arrangement of FIG. 5 has been given assuming that grating 86 is a density grating, as such structure is most easily shown in the drawing. However, as stated above, a phase grating may be substituted for the density grating. A phase grating has a cyclical thickness variation which number of cycles is equal to the line density of the density grating, or 300 lines per inch in the example given. The phase grating is preferred to the density grating as it has no opaque portions to reduce the light transmission. The thickness variation of the phase grating bunches the light impinging upon it to produce the same effect as the density grating previously described.

Whether a density or phase grating is used as the fine grating, it acts in combination with the respective color-encoding gratings to produce the desired encoded color spatial frequencies, but because of the relatively wide angle bundles of light rays passed by the encoding filters, the fine grating itself is not in sharp focus and therefore its line structure is not present to any objectionable degree in the wideband luminance signal transmitted by the encoding filters. H

What is claimed is:

1. In a color-encoding camera including a photosensitive medium, the combination comprising:

first color-encoding filter means including first and second superimposed and angularly disposed gratings each having alternate and parallel strips of material disposed over the entire area of said filter, one set of strips of said first grating passing light containing two of three primary colors and one set of strips of said second grating passing light containing another two of three primary colors and the other set of strips of both gratings passing light containing substantially all colors, said filter being disposed in the optical path of said camera between a subject and said photosensitive medium; and means including a grating structure comprising a second color encoding filter having two superimposed and angularly disposed gratings have alternate and parallel strips of material, the strips of each grating being parallel to the strips of a respective one of said first mentioned gratings for passing light of the same color ranges as said strips of said respective first mentioned gratings and having a pitch which is finer than the pitch of the strips of said gratings of said first color-encoding filter means disposed in collimating relationship with the gratings of said first color-encoding filter disposed between said first color-encoding filter means and said photosensitive medium for shadowing said color-encoding pattern onto said photosensitive medium so that an encoded color image of said subject is formed on said photosensitive medium.

2. Apparatus according to claim 1 wherein said strips of said first gratings comprise transparent material and cyan light passing material, and said strips of said second gratings comprise transparent material and yellow light passing material.

3. In a color-encoding camera including a photosensitive medium, the combination comprising:

color-encoding filter means including first and second gratings spaced apart from each other and having alternate and parallel strips of material disposed over the entire area of said filter for encoding light of different colors onto said photosensitive medium, and means including a density grating having alternate opaque and transparent strips disposed in the optical path between said color encoding filter means and said photosensitive medium, the strips of said density grating being parallel to the strips of said color-encoding filter means, the strips of said density grating having a pitch which is finer than the pitch of the strips of either of said first and second gratings and disposed in collimating relationship with both of said first and second gratings for shadowing said color-encoding strips onto said photosensitive medium.

4. Apparatus according to claim 3 wherein said color-encoding filter means comprises a first color-encoding filter having alternate strips of yellow light passing material and transparent material, and a second color-encoding filter having alternate strips of cyan light passing material and transparent material, said first and second filters spaced apart from each other and each of said filters spaced from said grating structure in respective collimating relationships for producing separate spatial frequencies at said photosensitive medium for each of said spectral ranges of light.

5. In a color-encoding television camera including an image pickup tube having a photosensitive electrode scanned by an electron beam, the combination comprising:

first color-encoding filter means including two superimposed and angularly disposed gratings, each grating having alternate and parallel strips of material disposed over its entire area one set of strips of one grating passing light containing two of three primary colors and one set of strips of the other grating passing another two of three primary colors and the other set of strips of both gratings passing light containing substantially all colors, said filter being disposed in the optical path of said camera between a subject and said photosensitive electrode; and means including a grating structure comprising second two superimposed and angularly disposed gratings each having strips of material parallel to the strips of one of said first gratings for passing light of the same spectral ranges as said strips of said first mentioned gratings and having pitches which are finer than the pitch of the strips of said first-mentioned gratings disposed in collimating relationship with said first-mentioned gratings and disposed between said first-mentioned gratings and said photosensitive electrode for shadowing said color encoding pattern onto said photosensitive electrode of said image pickup tube so that an encoded color image of said subject is formed on said photosensitive electrode.

6. Apparatus according to claim 5 wherein both of said color encoding filters comprise a first grating of alternate cyan and transparent strips and a second grating superimposed on said first grating and angularly disposed from said first grating and having alternate yellow and transparent strips whereby a color-encoding filter pattern having a pitch determined by the difference of the pitches of said first and second color-encoding filters is shadowed onto said photosensitive electrode, and whereby red and yellow color representative signals having different spatial frequencies are derived from said image pickup tube as said photosensitive electrode is scanned by said electron beam.

7. In a color-encoding television camera including an image pickup device having a photosensitive electrode scanned by an electron beam, the combination comprising:

color-encoding filter means comprising a first grating having alternate strips of cyan and transparent material for encoding red light and a second grating superimposed on said first grating and having alternate strips of yellow and transparent strips for encoding blue light angularly disposed from the strips of said first grating and disposed in the optical path of said camera between a subject and said photosensitive electrode; means including a grating structure comprising a density grating having a pitch which is finer than the pitch of said strips of said color-encoding filter means disposed in collimating relationship with each of said color-encoding gratings, whereby a color-encoding filter pattern is shadowed onto said photosensitive electrode, said filter pattern having pitches determined by said color encoding gratings and said density gratings and whereby red and blue color representative signals having different carrier frequencies are derived from said image pickup tube as said photosensitive electrode is scanned by said electron beam.

8. In a color-encoding television camera including an image pickup device having a photosensitive electrode scanned by an electron beam, the combination comprising:

color-encoding filter means having alternate and parallel strips of material disposed over the entire area of said filter comprising a first color-encoding filter having alternate strips of yellow light passing material and transparent material, and a second color-encoding filter having alternate strips of cyan light passing material and transparent material, said first and second filters spaced apart from each other and being disposed in the path of said camera between a subject and said photosensitive electrode; and means including a density grating structure having a pitch which is finer than the pitch of the strips of said color-encoding filter means disposed between said color encoding means and said photosensitive electrode, said first and second color-encoding filters being in respective collimating relationships with said density grating for producing separate spatial frequencies as said photosensitive electrode is scanned by said electron beam.

* * * * *

UNITED STATES PATENT OFFICE
CERTIFICATE OF CORRECTION

Patent No. 3,619,489 Dated November 9, 1971

Inventor(s) Hugh F. Frohbach, et al

It is certified that error appears in the above-identified patent and that said Letters Patent are hereby corrected as shown below:

Column 1, Line 45, delete "$MH_z$" (second occurrence) and substitute -- blue --. Column 3, Line 35, delete "bandpass" and substitute -- of --. Column 7, Line 25, delete "H". Column 8, delete Claim 6 (in its entirety). Claim 8, Column 9, Line 11, after "the" insert -- optical --.

Column 8, line 54, "7." should read -- 6. --. Column 9, line 1, "8." should read -- 7. --. In the heading to the Cover Sheet, "8 Claims" should read -- 7 Claims --.

Signed and sealed this 1st day of August 1972.

(SEAL)
Attest:

EDWARD M.FLETCHER,JR.
Attesting Officer

ROBERT GOTTSCHALK
Commissioner of Patents